COLOR TELEVISION TRANSMITTER

Filed Aug. 20, 1949 2 Sheets-Sheet 1

INVENTOR
John Evans
BY
[signature]
ATTORNEY

COLOR TELEVISION TRANSMITTER

Filed Aug. 20, 1949 2 Sheets-Sheet 2

INVENTOR
John Evans
BY
ATTORNEY

United States Patent Office 2,810,781

Patented Oct. 22, 1957

2,810,781

COLOR TELEVISION TRANSMITTER

John Evans, Princeton, N. J., assignor to Radio Corporation of America, a corporation of Delaware Application August 20, 1949, Serial No. 111,384

6 Claims. (Cl. 178—5.4)

This invention relates to color television and more particularly to the pick-up, transmission, and reproduction of images in substantially their natural color.

Images in their natural color may be transmitted over electrical circuits by analyzing the light from the object being televised not only into its image elements but by also analyzing the light of the object into selected primary or component colors and developing therefrom an electrical signal train. The image may then be reproduced in its natural color at a remote location by appropriately demodulating the signal train and constructing a color image therefrom.

The basic law of the transmission of visual information by electricity that a single electrical-transmission circuit can carry but one item of information at a time is, of course, as true with the transmission of color images as it is true with the transmission of black and white images. For example, if several voltage trains, representative of several different selected component colors are applied simultaneously to a single circuit, the corresponding current impulses lose their separate identities in the circuit and cannot be separated at the receiving end of the circuit, unless complicated arrangements are employed. Consequently, the impulses must be conveyed in "single file" or "sequentially" unless separate circuits for each of the selected component colors are employed.

Heretofore the most popular sequential method has been what is commonly called the field sequential method.

In the transmission of color images by the field sequential method, a single image pick-up tube such as, for example, the so-called image orthicon is exposed in succession to images giving color separation corresponding to the various selected component colors. During the period that the camera tube is exposed to each component color image, the mosaic is concurrently scanned to enable the transmission of signals representing the corresponding color separation image. The proper color separation images may be supplied to the image pick-up tube sequentially by a mechanical arrangement of rotating filters. The color separation may also be obtained by electronic switching of several differently color sensitive image pick-up tubes in sequence.

In the conventional field sequential multi-color television receiver a kinescope or another image producing tube is employed to recreate a black and white image likeness which is viewed or projected through a color filter of the selected component color corresponding to the desired component color instantaneously being represented at the transmitter. The process is then repeated for the next selected color component and so on. The processes are repeated rapidly enough that the several component colors appear simultaneously to the human eye. A typical field sequential color television system is shown and described in an article entitled "An Experimental Color Television System" beginning on page 141 of RCA Review for June 1946.

Although color images have been successfully reproduced by the aforesaid sequential method, there are certain fundamental difficulties involved which tend to reduce the entertainment value of the field sequential system. One serious difficulty is that color action fringes result from movement between individual component color scannings because of the great amount of time required for the scanning of a complete field.

This difficulty for the field sequential method of color image transmission is eliminated if the rate of change between the selected color components is made rapid enough to overcome any indication of movement between the different selected component color representations.

If, for example, an "elemental" sequential rate is employed, that is, if each small image area or image element is divided into three separate component colors and for each elemental area of the image there are transmitted sequentially, three different color representations, each of whose amplitude or energy depends upon the selected component colors of the image element, no difficulty will be experienced with color action fringes.

It at once becomes apparent, however, that such a method and arrangement would require not only accurate synchronism in the scanning raster, but it would require also an accurate synchronism or speed control in each traverse of the scanning element in order that the corresponding color representation at both the transmitter and receiver would be scanned in perfect synchronism.

According to this invention an improved arrangement is provided whereby color television signals are transmitted in an elemental sequential arrangement and there is employed a novel arrangement for synchronizing the color representations throughout each scanning line.

According to this invention an oscillator or other signal generating device having a frequency much greater than the horizontal scanning frequency is controlled in synchronism with the transmitter by the horizontal synchronizing pulse. The output signal of this controlled oscillator is employed to sequentially switch at an elemental sequential rate the several different component color cathode ray beam tubes or other selected component color image devices in phase and in synchronism at the transmitter and receiver.

A primary object of the invention is therefore to provide an improved color television system.

Another object of this invention is to eliminate color action fringes in sequential color television systems.

Still another object of this invention is to eliminate registration problems in color television systems.

Still another object of this invention is to maintain equal sweep speed at both the transmitter station and the receiving station of an elemental sequential color system.

Another object is to provide a color television system which is fully compatible with the presently standard black and white transmissions.

Other and incidental objects of the invention will be apparent to those skilled in the art from a reading of the following specification and an inspection of the accompanying drawings in which.

Figure 1:
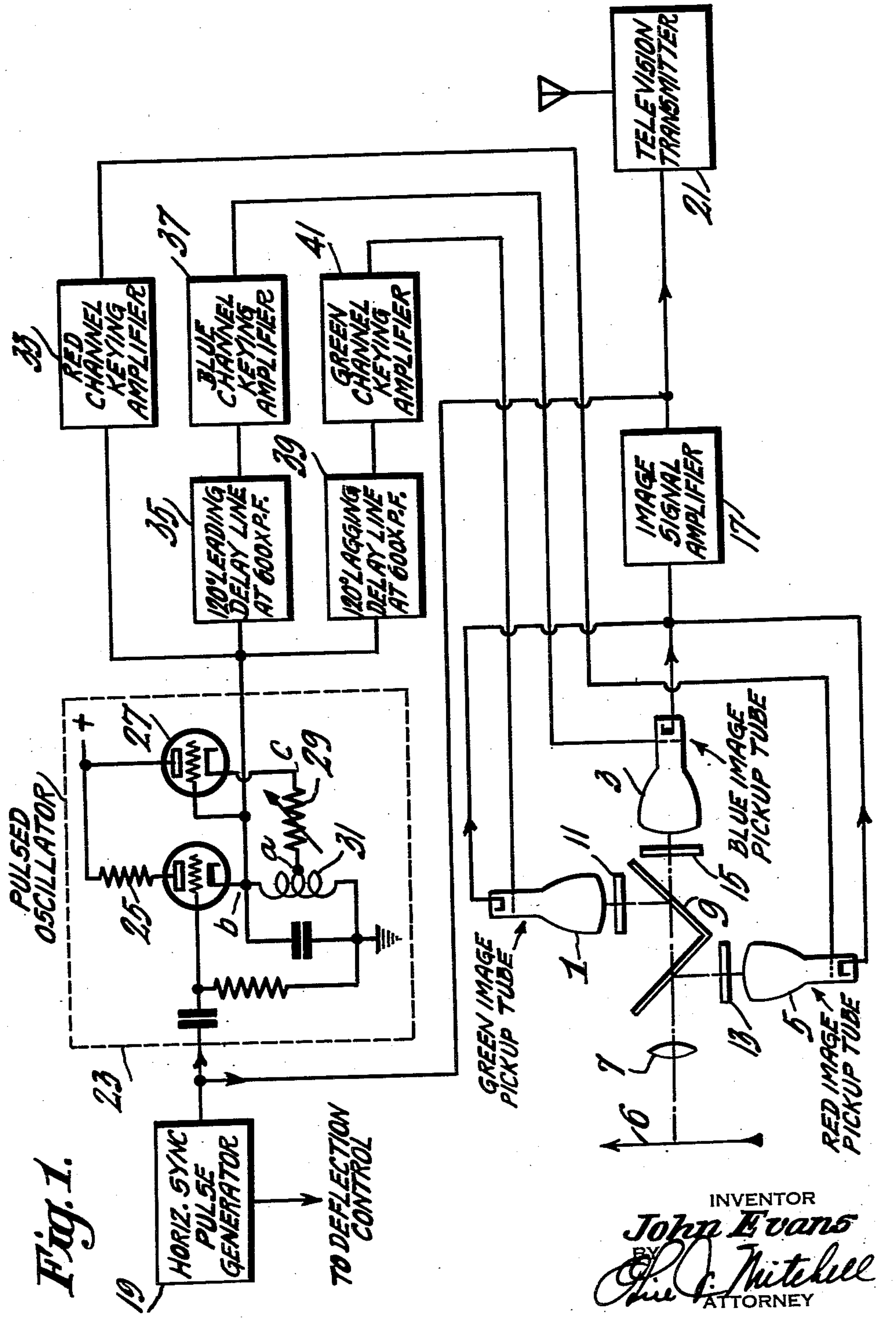
Figure 1 shows in block diagram one form of this invention as it is employed at the transmitting station.

Turning now in more detail to Figure 1 there is illustrated by block diagram, a color television camera employing three image pick-up tubes 1, 3, and 5 which receive selected component color images in registry from the object 6 illustrated by an arrow.

The green component color image of the arrow is projected through lens 7 and light divider 9 to the image pick-up tube 1 through the green filter 11. Likewise the red color component of the object 6 is directed to image pick-up tube 5 through red filter 13. The blue component of the object 6 is transmitted to the blue image pick-up tube 3 through blue filter 15.

Dichroic deflectors may be employed in the place of half-silvered mirrors 9 and filters 11, 13, and 15. An improved light splitter or arrangement for separating component color images is shown and described in a co-pending application of Alfred C. Schroeder, Serial No. 731,647, filed February 28, 1947, now Patent No. 2,642,487, granted June 16, 1953. According to the application of Alfred C. Schroeder, referred to immediately above, a pair of intersecting dichroic mirrors are positioned to extend through each other and are provided with an optical axis which intersects substantially perpendicular to and at the intersection of the two dichroic mirrors to provide for component color separation or combination.

The output signal from each of the pick-up tubes 1, 3, and 5 is combined in image amplifier 17 as illustrated by block diagram.

As has been indicated above, the several component color signal representations would lose their identities if they were simultaneously combined in image signal amplifier 17.

According to this invention, however, the several different selected component color image pick-up tubes 1, 3, and 5 are keyed into operation only during sequentially recurring time intervals. This operation may also be accomplished by providing a keyed amplifier following each pick-up tube 1, 3, and 5 and keying the amplifiers into operation only during sequential time intervals.

The keying operation is controlled by the horizontal synchronizing pulse which is obtained in the horizontal synchronizing pulse generator 19 which is illustrated in block and may be a circuit arrangement connected to and driven by the primary signal generator of the transmitting station.

The on-off operation of the image pick-up devices 1, 3, and 5 may be obtained by applying the controlling pulses to their respective control electrodes as illustrated.

It will be noted in this regard that the scanning deflection for the several image pick-up devices 1, 3, and 5 is also obtained from the horizontal sync pulse generator 19.

A portion of the output signal of the horizontal sync pulse generator 19 is combined with the image signal and is transmitted through the television transmitter 21 in the usual manner.

Another portion of the synchronizing signal energy is applied to a pulsed oscillator 23 which may take the form, for example, of any pulsed oscillator, the theory of operation of which is well shown and described beginning on page 140 of the textbook entitled "Wave Forms" published in 1949 by the McGraw-Hill Book Co., Inc.

The pulsed Hartley oscillator shown will be briefly described in order that a better understanding of the operation of applicant's device will be had.

It is essential that the oscillations always start in the same phase as the horizontal synchronizing pulse and it is desirable that the starting transient be of as short a duration as possible. In addition, it should be possible to stop the oscillations quickly in order that the circuit may be ready for another timing cycle.

In order to start an oscillation with no transient, voltages and currents in the quiescent state must have values that they will have simultaneously at some instant in the steady state. To achieve this in a simple manner one necessarily chooses an oscillating circuit which involves the fewest components. Phase-shift or bridge oscillators are obviously unsuited to this arrangement. Resonant circuit oscillators and in particular, the Hartley circuit, are better adapted to this type of operation, provided certain precautions are taken to time constants involved in the biasing circuit.

The simplest form would, of course, be a ringing circuit. However, in order to prevent the decay of the oscillations in a ringing circuit, it is necessary to replace the energy dissipated in its resistance. This can be done by means of the simple Hartley oscillator.

The oscillations are initiated by a negative gate or pulse applied to the grid of tube 25. In this instance, the negative gate is the negative-going, or trailing, edge of a positively polarized horizontal sync pulse derived from the generator 19. The voltage from point $b$ of the resonant circuit is applied to the grid of the second vacuum tube 27 connected as a cathode follower, the cathode being returned through resistance 29 to the center tap $a$ of the inductance 31. Assuming perfect coupling between the two halves of the inductance 31, the impedance looking into the center tap is $Q\omega L/4$ and is resistive. Hence, if resistance 29 is equal to $Q\omega L/4$, the voltage feedback to the center tap $a$ will be one-half the voltage at $b$. Because of the auto-transformer action of inductance 31 the net feedback voltage at the grid of tube 27 is just twice the voltage at $a$ or is just equal to the voltage at $b$. Assuming tube 27 to have unity gain it is apparent that oscillations of constant amplitude will occur. In practice the gain of tube 27 is always slightly less than unity and the coupling between the two halves of inductance 31 is not perfect. The effect of these factors is to reduce the amount of feedback. This can be compensated for by a reduction of resistance 29. Resistance 29 is therefore shown as a variable resistor and is adjusted to produce oscillations of constant amplitude.

At the end of the negative gate pulse, which is the positive-going, or leading, edge of a horizontal sync pulse, applied to the control electrode of tube 25, tube 25 again becomes conducting so that the oscillations are rapidly damped to zero amplitude usually within two or three cycles by the low-cathode impedance of tube 25.

The frequency stability of this oscillator is very good since the oscillator tube 27 is operated in a linear region and no grid current flows.

The output signal from oscillator 23 is passed through red channel keying amplifier 33 without change in phase. The keying amplifier may be, for example, a peaking device which will key the red image tube 5 into operation only at the peak of a positive cycle.

The output signal of oscillator 23 is also passed through a 120° leading delay line 35 to the blue channel keying amplifier 37 which controls the blue image pick-up tube 3. Likewise a portion of the output of oscillator 23 is passed through filter 39 which provides for 120° lagging signal which in turn controls the green channel keying amplifier 41. Two different delay lines or one delay line with different terminals may be employed if desired.

It will be seen therefore that the several image pick-up tubes 1, 3, and 5 will be keyed into operation only during sequential time intervals at a rate set by the pulsed oscillator 23. It will be remembered that the synchronism of the pulsed oscillator 23 is maintained by the horizontal synchronizing pulse generator 19 which information is also transmitted to the receiver through transmitter 21.

Figure 2:
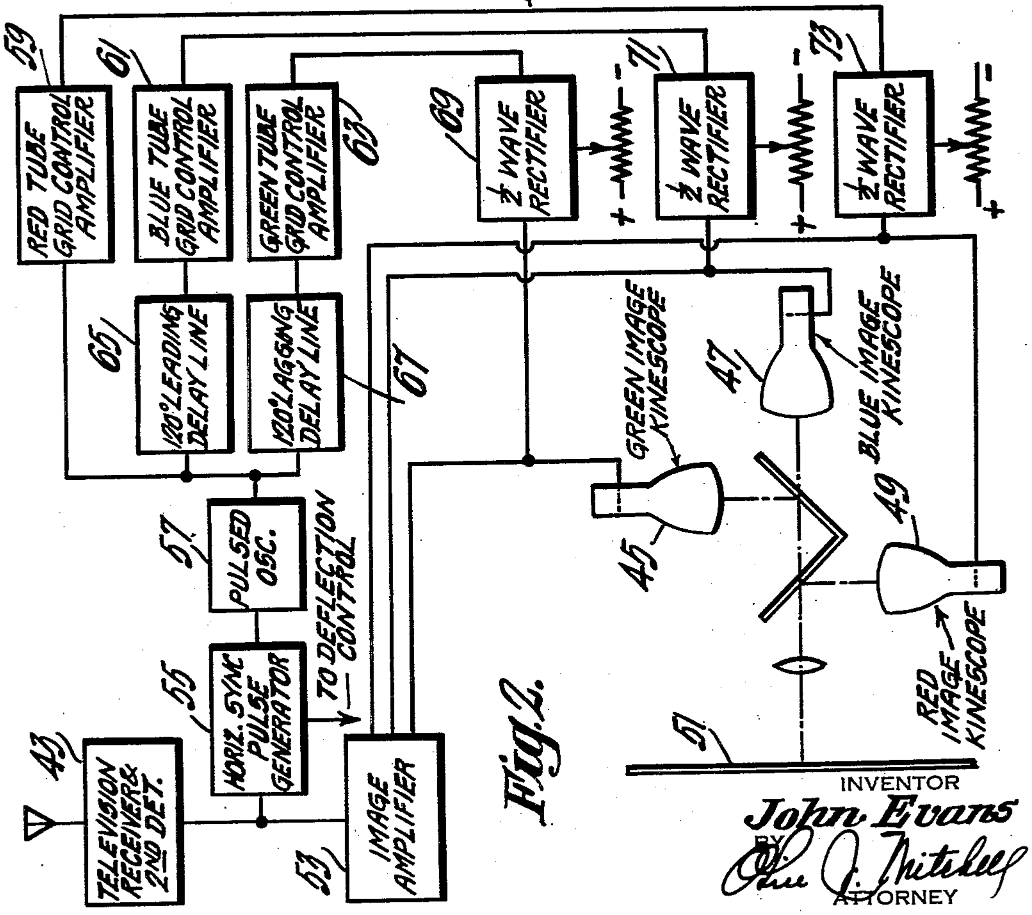
Figure 2 illustrates in block diagram this invention employed at the receiving station; and, Figure 3 shows graphically the operation of this invention.

Turning now to Figure 2 there is illustrated by block 43 a television receiver with second detector which may be preceded conventionally by a tuner, first detector, and I. F. amplifier as in any of the well known forms of black and white receivers presently on the market. However, for color reproduction three image reproducing tubes 45, 47, and 49 are provided with an optical system for combining several images to screen 51.

It will be seen that the image signal is applied to tubes 45, 47, and 49 simultaneously through image amplifier 53.

It will, of course, be seen that unless the three image reproducing tubes 45, 47, and 49 are keyed into operation sequentially in phase and at a frequency of the pick-up tubes at the transmitter, no color image can be reproduced.

If, however, the tubes are keyed into operation in a manner similar to the keying at the transmitter, the image may be reproduced in its natural color.

The keying in the receiving system is accomplished by utilizing the horizontal synchronizing pulses obtained from horizontal synchronizing pulse generator 55 which is keyed into operation by the received horizontal pulses.

The pulsed oscillator 57, which may take the same form as the pulsed oscillator 23 shown and described for the transmitter in Figure 1, drives the associated red, blue, and green control amplifiers 59, 61, and 63 through phase delay circuits 65 and 67.

Half-wave rectifiers 69, 71, and 73 are included in the circuit to provide for proper shaping of the keying pulses which are applied to the control electrodes of the image reproducing tubes 45, 47, and 49. Any suitable arrangement may be provided which will key the image reproducing tubes into operation only during the designated time intervals which corresponds to the transmitted color signal representations.

Figure 3:
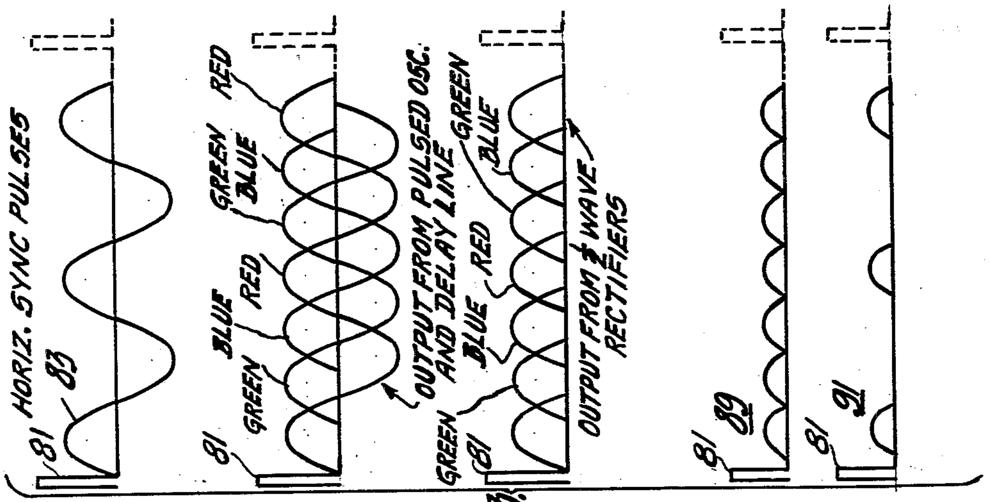

Figure 3 shows graphically the operation of the pulsed oscillator and the provision of a three-phase signal for employment in keying the several component color cathode ray tubes.

Although the waveforms of Figure 3 are shown as sine waves, other waveforms such as sawtooth or square waves may be employed without departing from the spirit of this invention.

The positively polarized synchronizing pulse 81 stops the oscillator at the beginning of the pulse 81 by positively biasing the oscillator tube as explained above in connection with Figure 1.

When the positive bias is removed at the end of the pulse 81, the oscillator begins a series of oscillations as indicated by curve 83.

The delay lines 35 and 39 of Figure 1 will produce a three-phase series of curves such as shown by curves 85.

By rectifying the three-phase signal 85 there will be obtained a series of pulses as shown in curve 87. Such rectification may be obtained as illustrated in Figure 2 by employment of half-wave rectifiers 69, 71, and 73.

It may, however, be desirable for the purposes of eliminating cross-talk between color channels, to bias the rectifiers to produce a curve such as indicated in Figure 3 by curve 89. This can be accomplished by providing a bias to the rectifiers 69, 71, and 73 of Figure 2 in any of the well known manners.

Curve 91 illustrates the pulses obtained at each of the separate color kinescopes. It will be seen therefore, that the separate kinescopes 45, 47, and 49 will be turned on at an elemental rate.

Having thus described the invention, what is claimed is:

1. A color television transmitter comprising means for producing sets of signals representative respectively of different component colors of an image being transmitted, said means including camera apparatus, scanning means for said apparatus and a source of line frequency scanning current, means for generating a reference wave of a frequency which is much greater than the line frequency, means for controlling the frequency of the reference wave from the source of line frequency current, means for utilizing the reference wave to develop from the respective sets of signals, and substantially in elemental sequences from each elemental area of the image, voltages representative of different colors and respectively dependent in amplitude upon the amplitudes of the plurality of sets of color signals, and means for transmitting signals modulated by such color voltages.

2. A color television transmitter comprising camera apparatus including a plurality of devices each including cathode ray producing and controlling elements, said devices being operable in transmission of a plurality of sets of signals representative respectively of different component colors of an image being transmitted, a source of line frequency scanning current for the camera apparatus, an oscillator operable at substantially elemental frequency and connected to and synchronized by the source of line frequency current, and means effectively connected between the oscillator and each of the cathode ray producing and controlling devices for utilizing the oscillations from said oscillator to develop from the respective sets of signals, and substantially in elemental sequence from each elemental area of the image, voltages representative of different colors and respectively dependent in amplitude upon the amplitudes of the plurality of sets of color signals and corresponding respectively in phase to different phases of the reference wave, and means for transmitting signals modulated by such color voltages.

3. A color television transmitter comprising camera apparatus including a cathode ray producing and controlling means operable in transmission of a set of signals representative of the image in one of its component colors, a second cathode ray producing and controlling means operable in transmission of a set of signals representative of the image in a second component color, and a third cathode ray producing and controlling means operable in transmission of a set of signals representative of the image in a third component color, a source of line frequency scanning current for the camera apparatus, an oscillator operable at substantially elemental frequency and connected to and synchronized by the source of line frequency current, said oscillator producing high frequency oscillations in a succession of series of oscillations, each series initiated by a horizontal synchronizing pulse and controlled in phase thereby, and connections between the oscillator and each of the cathode ray producing and controlling means causing the oscillations from said oscillator to develop from the respective sets of signals, and substantially in elemental sequence from each elemental area of the image, voltages representative of different colors and respectively dependent in amplitude upon the amplitudes of the plurality of sets of color signals, and means for transmitting signals modulated by such color voltages.

4. In a color television receiver of the type employing a plurality of selected component colors and having a predetermined horizontal scanning line frequency, an arrangement for synchronizing color reproduction in the intervals between scanning lines upon the development of color synchronizing information from received horizontal deflection synchronizing pulses having a repetition rate equal to said horizontal scanning line frequency, said arrangement comprising in combination: a source of sine wave energy, said sine wave energy source having a frequency synchronizing terminal, said sine wave energy having a frequency greater than said predetermined horizontal scanning line frequency; and means for developing at a rate equal to said horizontal scanning line frequency intermittently recurring synchronizing energy for said sine wave energy source from said horizontal deflection synchronizing pulses and for applying said developed synchronizing energy directly to said frequency synchronizing terminal only in the intervals between horizontal scanning lines, said sine wave energy source running free during the remainder of the operating interval.

5. In a color television receiver of the type employing a plurality of selected component colors and adapted to develop color synchronizing information in the intervals between horizontal scanning lines from received horizontal deflection synchronizing pulses having a repetition rate equal to said horizontal scanning line frequency, an arrangement for synchronizing color reproduction comprising in combination: a normally free-running source of sine wave energy of image elemental frequency and wherein the phase of said sine wave energy is representative of one of said selected component colors, said sine wave energy source having a frequency synchronizing terminal; and means for developing at a rate equal to said horizontal scanning line frequency intermittently recurring synchronizing energy for said sine wave energy source from said horizontal deflection synchronizing pulses and for applying said developed synchronizing energy directly to said frequency synchronizing terminal in the intervals between horizontal scanning lines.

6. In a color television receiver adapted to receive a composite signal having color video information and horizontal deflection synchronizing pulses, said color video information comprising a plurality of video signals produced by scanning an object in successive rectangular fields each comprising a plurality of vertically spaced horizontal lines having a fixed repetition frequency, said plurality of video signals being respectively representative successively of the colors of the object at a repetition rate greater than said horizontal line repetition frequency and said horizontal deflection synchronizing pulses occurring in the time intervals between the scanning of horizontal lines and having a repetition frequency equal to the horizontal line repetition frequency, the combination including: a source of oscillations having a frequency greater than said horizontal line repetition frequency; means responsive to said composite signal to develop color synchronizing information for said source of oscillations from said horizontal deflection synchronizing pulses, said color synchronizing information having said horizontal line repetition frequency; means operatively and directly connecting said color synchronizing information developing means and said source of oscillations to control the relative phase of said oscillations by said color synchronizing information during time intervals between the scanning of horizontal lines; means operativevly connected to said source of oscillations for developing color control signals having the frequency of said oscillations and each having a different time relationship to said color synchronizing information; color control means responsive to said composite signal, said color control means being of such a nature as to segregate the different ones of said color video signals according to their respective time relationships to said color synchronizing information; and means operatively connecting said color control signal developing means to said color control means to impress said different electrical phases of said respective color control signals upon said color control means.

References Cited in the file of this patent

UNITED STATES PATENTS

| | | |
|---|---|---|
| 2,309,506 | Herbst | Jan. 26, 1943 |
| 2,333,969 | Alexanderson | Nov. 9, 1943 |
| 2,389,039 | Goldsmith | Nov. 13, 1945 |
| 2,423,769 | Goldsmith | July 8, 1947 |
| 2,431,115 | Goldsmith | Nov. 18, 1947 |
| 2,532,511 | Okolicsany | Dec. 5, 1950 |
| 2,545,325 | Weimer | Mar. 13, 1951 |
| 2,545,957 | Kell | Mar. 20, 1951 |

OTHER REFERENCES

Radio Engineers' Handbook by Terman, copyright 1943, by the McGraw-Hill Book Company Inc., pages 503, 510 and 511.